(12) United States Patent
Nagler

(10) Patent No.: US 6,656,326 B2
(45) Date of Patent: Dec. 2, 2003

(54) APPARATUS AND METHOD FOR WATER PURIFICATION USING SOLAR ENERGY

(76) Inventor: Lawrence Nagler, 2140 Federal Ave., Los Angeles, CA (US) 90025-5327

( * ) Notice: Subject to any disclaimer, the term of this patent is extended or adjusted under 35 U.S.C. 154(b) by 0 days.

(21) Appl. No.: 09/919,211

(22) Filed: Jul. 30, 2001

(65) Prior Publication Data

US 2002/0092761 A1 Jul. 18, 2002

Related U.S. Application Data

(60) Provisional application No. 60/262,122, filed on Jan. 16, 2001.

(51) Int. Cl.$^7$ ............................. B01D 3/02; C02F 1/14; F24J 2/00
(52) U.S. Cl. .................... 202/234; 159/904; 202/185.5; 202/185.6; 202/241; 203/10; 203/100; 203/DIG. 1; 203/DIG. 17; 203/DIG. 20; 126/600
(58) Field of Search ............................. 159/44, 42, 904, 159/DIG. 40; 202/234, 185.5, 185.6, 241; 203/10, DIG. 1, DIG. 17, DIG. 20, 100; 126/600

(56) References Cited

U.S. PATENT DOCUMENTS

| | | | | |
|---|---|---|---|---|
| 3,390,056 A | * | 6/1968 | Ingram | 202/83 |
| 3,407,122 A | * | 10/1968 | Dickinson | 202/83 |
| 4,053,368 A | * | 10/1977 | Courvoisier et al. | 203/10 |
| 4,137,901 A | * | 2/1979 | Maier | 126/648 |
| 4,148,293 A | * | 4/1979 | Lents et al. | 126/270 |
| 4,172,767 A | * | 10/1979 | Sear | 202/234 |
| 4,194,949 A | * | 3/1980 | Stark | 203/DIG. 1 |
| 4,227,970 A | * | 10/1980 | Howell, Jr. et al. | 202/234 |
| 4,276,122 A | * | 6/1981 | Snyder | 203/10 |
| 4,434,787 A | * | 3/1984 | Young, II | 126/438 |
| 4,504,362 A | * | 3/1985 | Kruse | 203/3 |
| 4,921,580 A | * | 5/1990 | Martes et al. | 203/DIG. 17 |
| 5,047,654 A | * | 9/1991 | Newman | 60/641.12 |
| 5,409,578 A | * | 4/1995 | Kaneko | 203/10 |
| 5,593,549 A | * | 1/1997 | Stirbl et al. | 203/10 |

OTHER PUBLICATIONS

PCT International Search Report, Jun. 5, 2002, Intl. Application No. PCT/US02/00316.

* cited by examiner

Primary Examiner—Virginia Manoharan
(74) Attorney, Agent, or Firm—Hogan & Hartson, LLP

(57) ABSTRACT

An apparatus for the desalination or purification of water includes a non-solid vessel (3) having a bottom defining an opening, the vessel (3) capable of being partially submerged below the surface of a body of water, a pan (5) located within the vessel (3), the pan (5) being flexibly connected to the inner wall of the vessel (3) and being located beneath the surface of the water (13), a lens fixably connected to the top of the vessel (3), wherein the lens is focused beneath the surface of the water (13) and above the surface of the pan (5) a device for varying the orientation of the vessel (3) in accordance with the location of the sun, and a device for condensing steam generated in the non-solid vessel (3), whereby steam generated in the non-solid vessel (3) is condensed outside of the non-solid vessel (3). A method for the desalination or purification of water includes the steps of containing a body of water within a vessel 3, the vessel 3 having a lens fixably attached at the top and bottom defining an opening, located a pan 5 just below the surface of the water 13, focusing the lens just beneath the surface of the water 13 and just above he bottom surface of the pan 5, condensing water vapor, re-filling the vessel 3 with water as the water is converted to steam, and periodically re-orienting the vessel in a manner that tracks movement of the sun.

6 Claims, 5 Drawing Sheets

APPARATUS AND METHOD FOR WATER PURIFICATION USING SOLAR ENERGY

RELATED U.S. APPLICATION

This application claims priority from provisional application No. 60/262,122, Jan. 16, 2001.

BACKGROUND

1. Field of the Invention

The present invention relates generally to an apparatus and method for water purification using solar energy. More specifically, the present pertains to the desalination and purification of a water source using solar energy.

2. Description of the Related Art

Fresh water represents less than 3% of the water on earth. Of this 3%, nearly 75% is "trapped" as ice throughout the world, predominantly on the polar ice caps. The remaining 97% of the earth's water is in the form of salt water or brackish water. Pollutants and drought result in further limit the supply of fresh water in some locations.

As the world's population increases, demand for fresh water has increased especially in arid and semi-arid regions. Salt water and brackish water have long been recognized as potential sources of potable water. Prior art methods of desalination of salt water and/or brackish water include reverse osmosis, evaporation and vapor compression.

In conventional distillation processes, operational costs associated with heating water to produce steam become a key factor in ultimate water cost.

Conventional reverse osmosis systems require pumps to create operational pressures. Reverse osmosis membranes are housed in pressure containers in order to receive the incoming pressurized water. Operational electrical cost for the pumps becomes a key factor in ultimate water cost. Because the cost of creating the pressure is so significant, conventional system connect multiple reverse osmosis elements in series so that brine water from the last element flows as input to the next element. Although any pressure drop across an element is minimal, salt concentration increases because some of the original water has permeated through the last element as product water. As salt concentration for downstream elements due to precipitation of salts increases, scaling of elements increases. Over time, this results in frequent maintenance, that is, cleaning of elements or replacement of elements. Because maintenance cost becomes significant, water pretreatment is done to try to reduce fouling and scaling. The problem, however, is that the cost of pretreatment materials becomes high. All the costs associated with reverse osmosis (electrical, maintenance, pretreatment, element replacement) add together to make the ultimate cost of desalinated water high.

Therefore, there is a continuing need for a method and apparatus for water desalination and/or purification that is efficient, inexpensive and requires infrequent maintenance.

SUMMARY OF THE INVENTION

It is an object of the present invention to provide an apparatus and method for desalinating seawater or brine and/or purifying fresh water that contains minerals, salts, and other dissolved solids or pollutants.

It is another object of the present invention to provide an apparatus and method for desalinating seawater or brine and/or purifying fresh water which contains minerals, salts, and other dissolved solids or pollutants which is energy efficient.

It is another object of the present invention to provide an apparatus and method for desalinating seawater or brine and/or purifying fresh water which contains minerals, salts, and other dissolved solids or pollutants, which uses focused solar energy to generate steam.

The apparatus of the present invention is placed in an ocean, lake, or other body of water from which purified water is to be extracted. In one embodiment of the present invention, the apparatus for the desalination or purification of water comprises a non-solid vessel with a bottom defining an opening that is capable of being partially submerged below the surface of a body of water and a pan located within the vessel that is flexibly connected to the inner wall of the vessel and beneath the surface of the water. A lens is fixably connected to the top of the vessel and is focused beneath the surface of the water and above the surface of the pan. Water in the pan is heated, thus producing water vapor as steam. The present invention includes a means for condensing water vapor outside the vessel. In one embodiment, the water vapor is transported to and condensed in a condensation coil below the surface of the water and then pumped to shore. The invention includes a means for varying the orientation of the vessel in accordance with the location of the sun so that the amount of solar energy captured and used in the purification process is maximized. For instance, in one embodiment, a sensing array, which locates the position of the sun, is electrically connected to a controller and a series of trim tanks around the periphery of the vessel. The controller controls the amount of water in the trim tanks such that the vessel and lens are positioned such that the sun's rays are maintained generally parallel to the focal length of the lens.

The method of the present invention comprises the steps of containing a body of water within a vessel, the vessel having a lens fixably attached at the top and a bottom defining an opening, locating a pan just below the surface of the water, focusing the lens just beneath the surface of the water and just above the bottom surface of the pan 5, condensing water vapor, re-filling the vessel with water as the water is converted to steam, and periodically re-orienting the vessel in a manner that tracks movement of the sun.

The above and other objects, features and advantages of the present invention will be more readily perceived form the following description of the preferred embodiments thereof taken together with the accompanying drawings and claims.

DETAILED DESCRIPTION OF THE INVENTION

Figure 1:
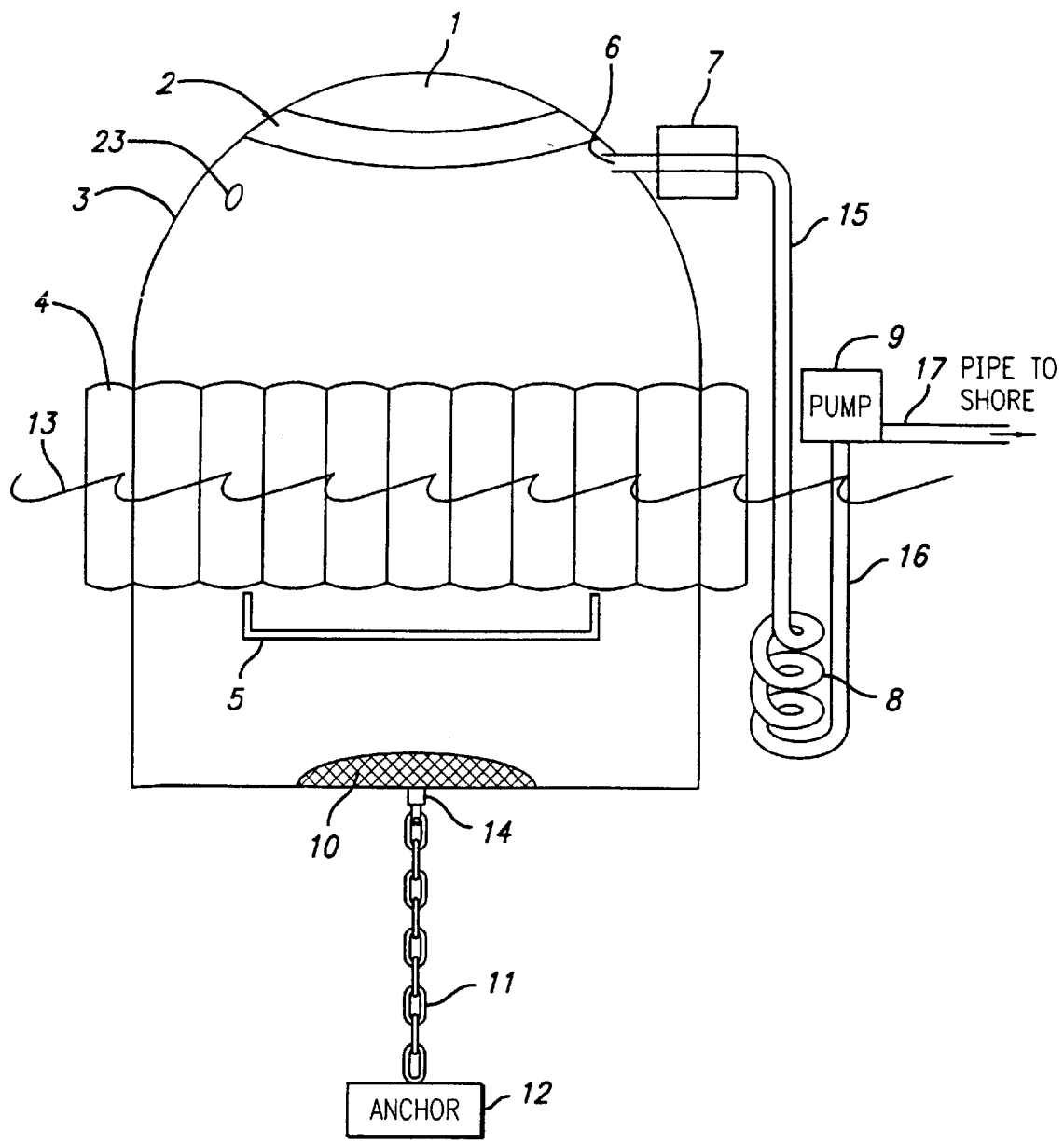
FIG. 1 is a side view of one embodiment of water desalination and purification apparatus that incorporates the present invention.

As shown in FIG. 1, a hollow, bell-shaped vessel 3 is rounded at the top and squared off at the bottom. The vessel is partially submerged in the surface 13 of an ocean, a lake, or another body of water from which purified water is to be drawn. The vessel and the other system components are made of suitable material with sufficient resistance to long-term exposure to water, seawater, and other materials found in the water to be purified.

A pan 5 is located within the hollow vessel 13 and flexibly connected to the internal walls of the vessel below the water's surface 13. Preferably the pan is gimbal mounted to the side wall of the vessel. The pan has a substantially flat bottom surface and a side wall that extends upward generally perpendicular to the bottom surface of the pan. The side walls are large enough to prevent rapid diffusion of heated water from inside the pan to the water outside the pan. Likewise, the top of the side wall is sufficiently close to the surface of the water to prevent rapid diffusion of heated water throughout the interior of the vessel. The pan is sized to allow water to pass freely between the inner walls of the vessel and the side walls of the pan. The bottom surface of the pan may contain one or more perforations. The pan is made of material that is compatible with long term exposure to sea water, contaminants in the water and other water borne materials or organisms. The pan may be stainless steel for instance.

The bottom of the vessel 3 includes a structure defining an opening. The opening may be covered with a grill 10 attached to the bottom of the vessel. The grill allows water to flow into and out of the vessel, while preventing the entry of fish and other organisms and objects into the vessel's interior.

An anchor 12 is connected to the bottom of the vessel 3. As shown in FIG. 1, the anchor may be attached to the grill 10 of the vessel by a universal joint 14 and chain 11. The anchor must weigh enough to hold the vessel in its partially submerged position. The required weight will depend on the size, material, and shape of the vessel to which it is attached. The anchor may be formed of concrete or another suitable material.

A lens 1 is integrated into the top of the body of the vessel 3 such that the lens is above the surface 13 of the water. The lens may be made out of any material that is capable of focusing sunlight and sufficiently resistant to the environment in which the vessel is used. The lens is configured to focus at a position between the surface 13 of the water and inside of the side walls of the pan 5, somewhat above the pan's bottom.

The vessel 3 is connected to a condensation coil 8 by piping 15 outside the vessel 3. The condensation coil is preferably below the surface 13 of the water. The piping 15 may include a pressure valve 6. The pressure valve may be any device, including a pressure relief valve or another pressure relief device capable of reacting to and controlling pressure inside the vessel. A pump 9 is connected to the condensation coil 8 by a pipe 16 to deliver water condensed inside the condensation coil to the shore via a second pipe 17.

Optionally, steam generated inside the vessel 3 may be passed through a small electric generator turbine 7 that is connected to the pipe 15 between the pressure valve 6 and the condensation coil 8. The pressure valve should be tuned such that the pressure of the steam exiting the vessel is sufficient to drive the turbine to produce energy sufficient to power an electrical controller (not shown).

Figure 2:
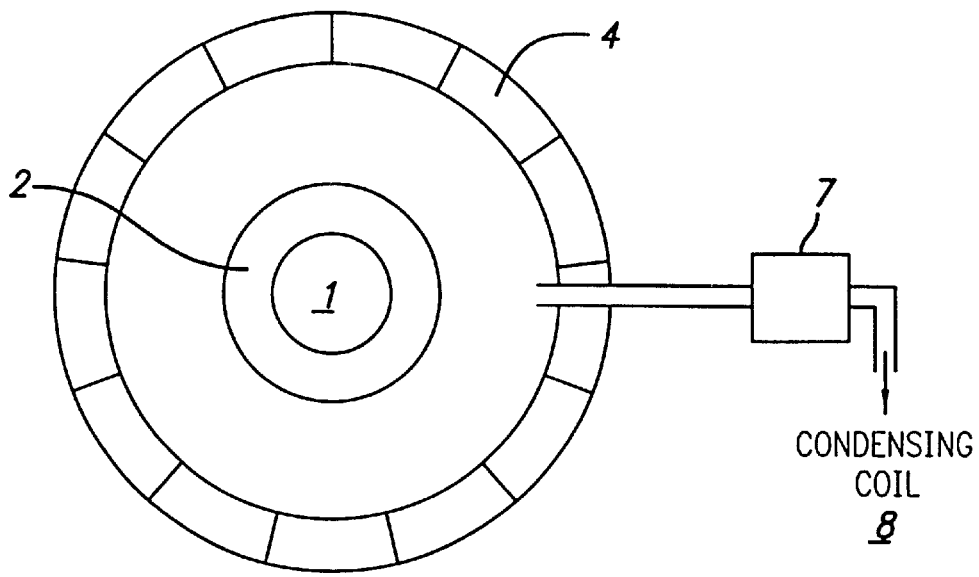
FIG. 2 is a top view of the water desalination and purification apparatus shown in FIG. 1.

The present invention includes means for altering the vessel's orientation according to the position of the sun above the vessel. Referring now to FIG. 2, the vessel 3 is reoriented by an apparatus including a sensing array 2, an electrical controller (not shown), and a series of trim tanks 4 around the periphery of the vessel. The sensing array senses the location of the sun in the sky above the vessel, using commercially available sun sensors. The sensing array is connected to the controller (not shown), which is connected in turn to a series of trim tanks 4. The trim tanks are variable ballast tanks. These tanks are partially submerged with water levels inside the tanks variable to control the orientation of the vessel. The trim tanks are fixed to the side of the vessel and placed so that the tanks are partially submerged beneath the surface 13 when the vessel is in the water.

The controller (not shown), preferably a computer, controls the water content of the trim tanks so that the vessel 13 and lens 1 are positioned such that the sun's rays are maintained generally parallel to the focal length of the lens. Movement of the vessel in alignment with the sun will be appropriately limited by the controller to ensure that the vessel does not overturn or sink. Depending on the vessel's configuration and its geographic location, it may not be possible to align the focal path of the lens exactly with the rays of the sun. Generally, though, the orientation of the vessel can be controlled to sufficiently enhance the efficacy of the lens in producing steam from water inside the vessel.

Other means for re-orientation of the vessel may be used. In another embodiment, the vessel may be flexibly connected to a pier, dock, barge or other stabilizing device. The connecting device, such as a gimbal joint, allows re-orientation of the vessel. In this embodiment, a sensing array and electrical controller such as has been described are connected to the vessel by a connecting device and a motor such that the motor re-orients the vessel 13 and lens 1 are positioned such that the sun's rays are maintained generally parallel to the focal length of the lens. Depending on the vessel's configuration and its geographic location, it may not be possible to align the focal path of the lens exactly with the rays of the sun. Generally, though, the orientation of the vessel can be controlled to sufficiently enhance the efficacy of the lens in producing steam from water inside the vessel.

A relief valve 15 may be located in the upper portion of the vessel 3 above the water surface 13. The relief valve may be any device, including a pressure relief valve, a rupture disk, or another pressure relief system operable to protect the system components from excess pressure within the vessel. A catwalk (not shown) may be attached to the outer perimeter of the vessel 3 above the surface 13 of the water to permit convenient access to the system's components for operation and maintenance.

Figure 3:
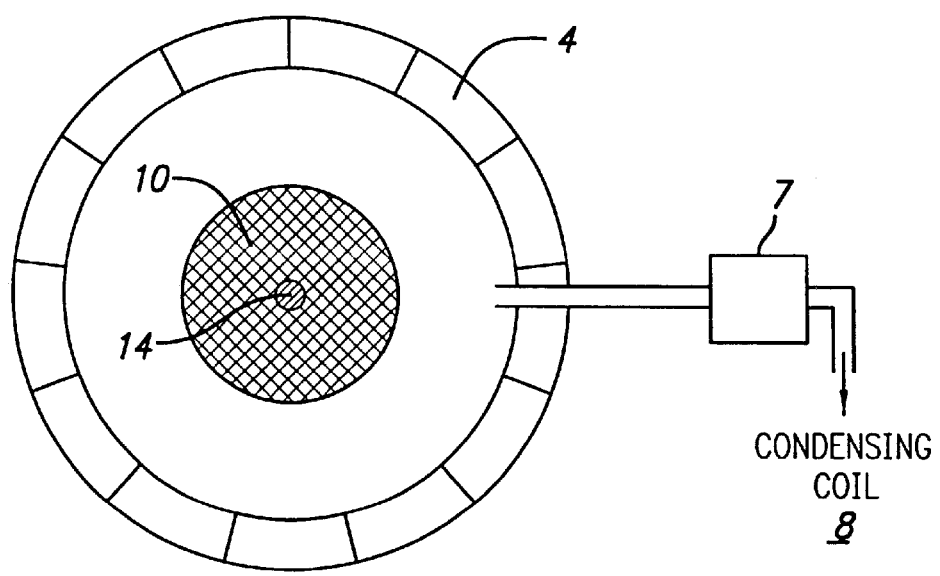
FIG. 3 is a bottom view of the water desalination and purification system shown in FIG. 1.
Figure 5:
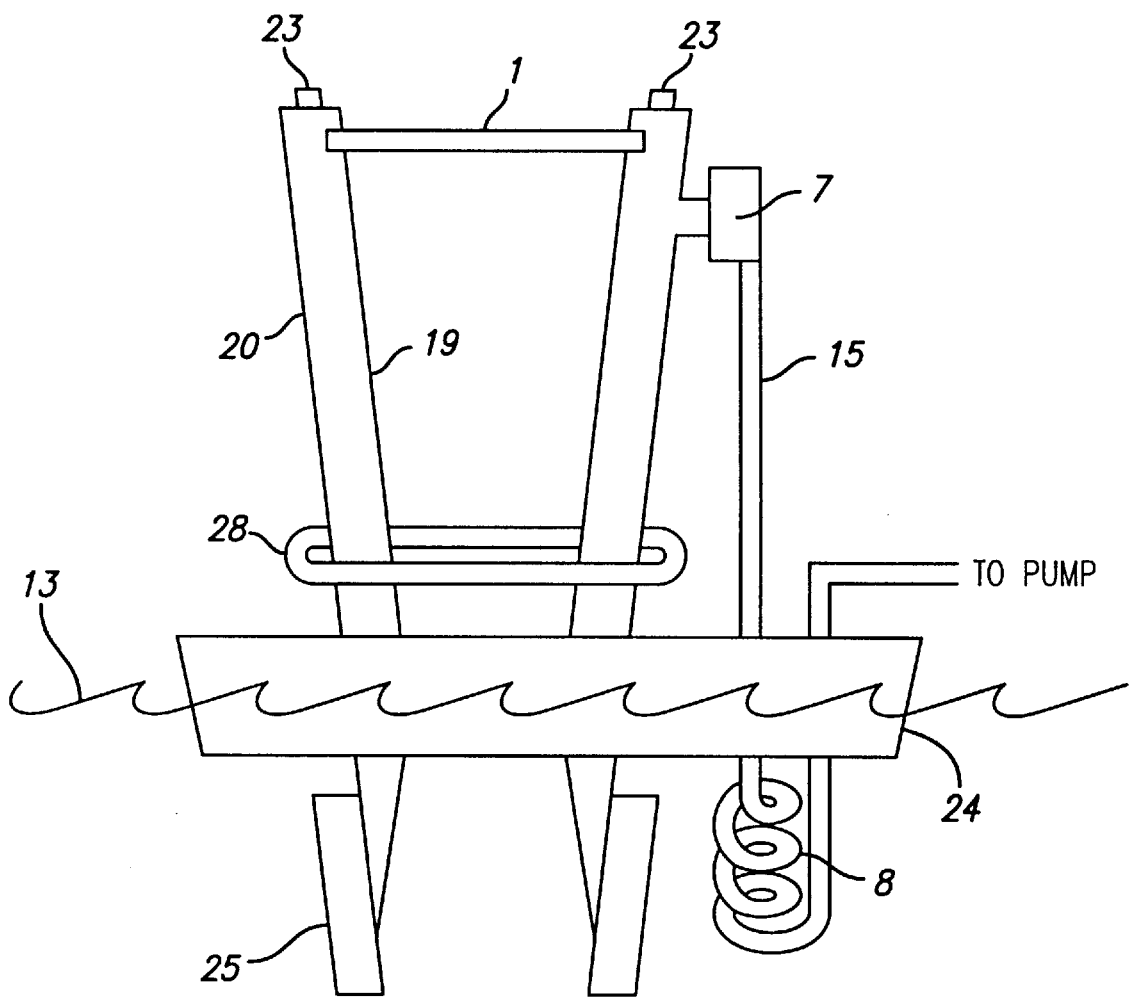
FIG. 5 is a side view of a third embodiment of water desalination and purification incorporating the present invention.
Figure 6:
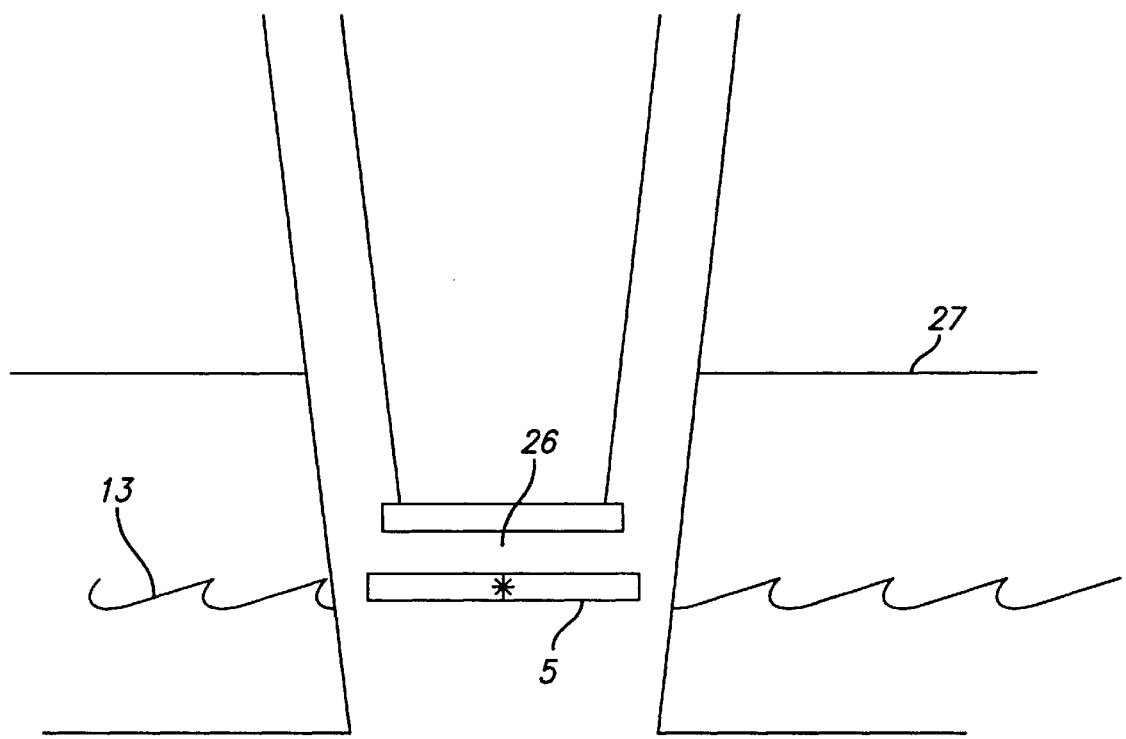
FIG. 6 is a detail view one aspect of the third embodiment of water desalination and purification incorporating the present invention.

As shown in FIG. 3, the vessel must be capable of maintaining a sufficiently stable position in a body of water. The vessel may be stabilized in the water by, for instance, trim tanks and a concrete anchor as shown in FIG. 1. However, other means of stabilizing the vessel are possible. For instance, as shown in FIG. 5, a suitable flotation material may be attached around the outer periphery of the vessel 3 together with ballast beneath the surface of the water. Further, as shown in FIG. 6, the vessel 3 may be stabilized in the water by flexibly connecting the vessel 3 to a pier, buoy, or other object capable of stabilizing the vessel (3) in a body of water, such as the deck of a ship or barge.

Figure 4:
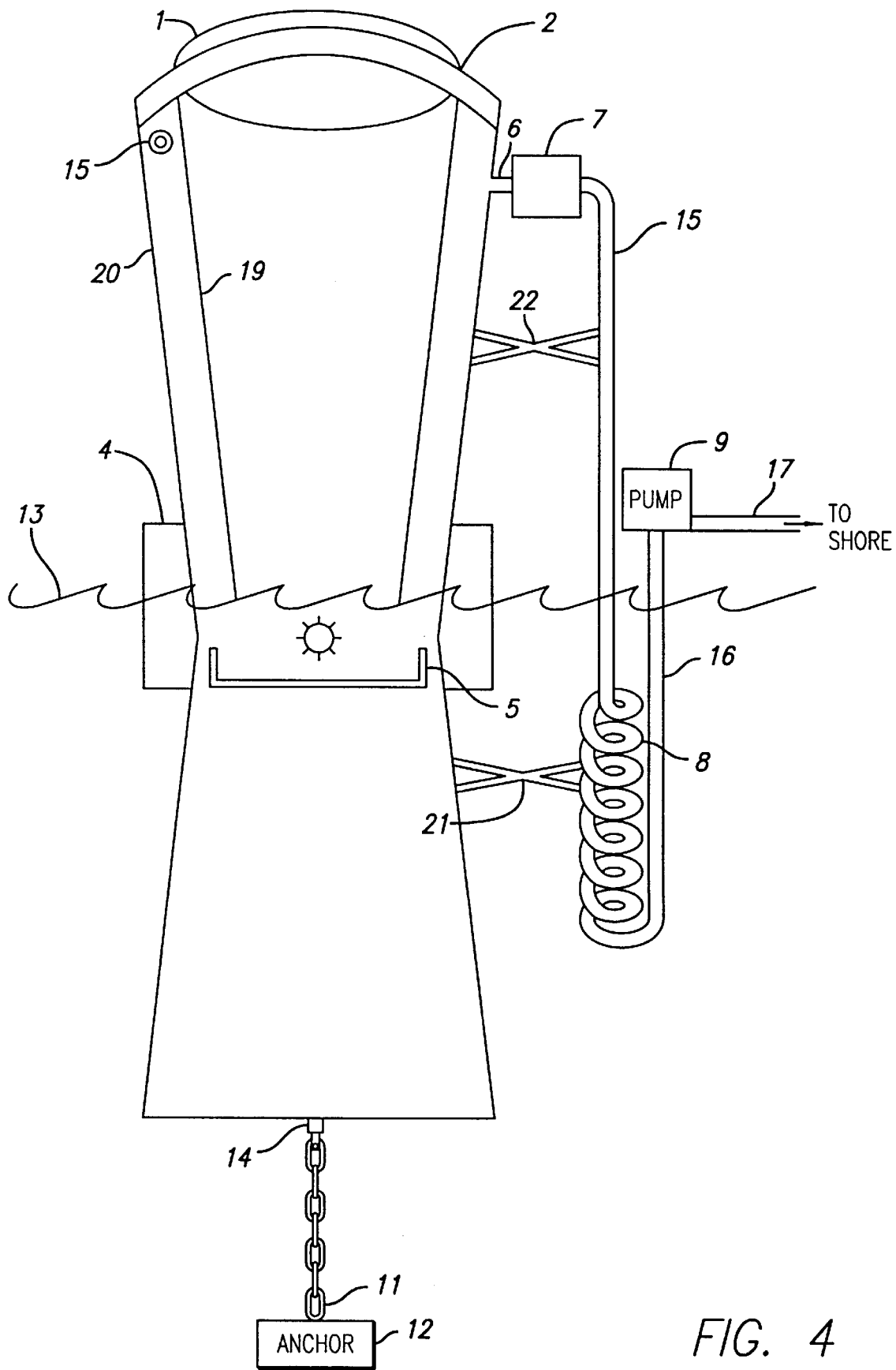
FIG. 4 is a side view of a second embodiment of water desalination and purification apparatus incorporating the present invention.

As shown in FIG. 3, the vessel 3 may be any shape that is capable of maintaining a sufficiently stable position in a body of water. For instance, a second embodiment of the present invention is shown in FIG. 4. In this embodiment, an hour glass shaped vessel includes an inner wall 19 and outer wall 20. The inner wall forms a truncated cone that is substantially parallel to the path of sunlight focused by the lens. The inner wall extends to near the surface of the water with the outer wall and inner wall parallel to one another. As shown in FIG. 6, a glass port hole may be attached to the inner walls of the vessel. The glass port hole prevents steam from passing into the interior of vessel and thus requiring the steam to pass through the space defined by the inner walls and the outer walls of the vessel.

In operation, the system is placed into a body of seawater or other water containing impurities such that the vessel 3 is partially submerged beneath the surface 13 of the water. Water flows from the body of water into the interior of the vessel through the opening in the bottom of the vessel such that the water level in the interior of the vessel is the same as the water level on the outside of the vessel. The sensing array 2 locates the position of the sun and the controller variably fills the trim tanks 4 to orient the vessel and lens 1 so that rays from the sun are aligned with the focal axis of the lens.

Sunlight is focused by the lens 1 at a location below the surface of the water 13 and inside the pan 5, thereby heating the water in the pan. The pan is placed below the surface of the water such that water can flow into the pan for heating but rapid diffusion of the heated water is prevented. By preventing rapid diffusion, the water in or around the focal point of the lens becomes sufficiently heated to produce steam. As steam is produced, the pressure inside the vessel increases. When the pressure is high enough, the pressure valve 6 opens to pass the pressurized steam through the piping 15 to the generator turbine 7 and to condensation coil 8 under the water's surface 13. The steam condenses inside the condensation coil as substantially pure water. The purified water is then pumped to the shore by pump 9 through the pipe 17. As the sun moves across the sky, the sensing array 2 continually locates the sun with the controller controlling the water level in the trim tanks 4 so that the lens 1 is continually oriented with the sun's rays aligned with the focal axis of the lens.

As steam is generated and drawn off from the top of the vessel 3, the water in the "working" region is continuously replenished by water flowing into the pan 5 inside the vessel. Further, the level of water inside the vessel is maintained by water flowing into the vessel through the opening in the vessel's bottom.

The invention has been described in terms of certain preferred and alternate embodiments which are representative and alternate embodiments which are representative of only some of the various ways in which the basic concepts of the invention may be implemented. Certain modification or variations on the implementation of the inventive concepts which may occur to those of ordinary skill in the art are within the scope of the invention and equivalents, as defined by the accompanying claims.

What is claimed is:

1. An apparatus for the distillation of water comprising:
   a non-solid vessel having a bottom defining an opening, the vessel partially submerged below the surface of a body of water;
   a pan located within the vessel, the pan being flexibly connected to a wall of the vessel and being located beneath the surface of the water;
   a lens fixably connected to the top of the vessel, wherein the lens is focused beneath the surface of the water and above the surface of the pan, such that an amount of water in or around the focal point of the lens becomes sufficiently heated to produce steam;
   means for varying the orientation of the vessel in accordance with a location of the sun; and
   means for condensing steam generated in the non-solid vessel, whereby steam generated in the non-solid vessel is condensed outside of the non-solid vessel, and
   wherein the means for varying the orientation of the vessel includes a sensing array, an electrical controller, and a gimbal joint, and
   wherein a grill is fixably connected to the bottom of the vessel.

2. The apparatus of claim 1, wherein the means for condensing steam is a condensation coil connected to the vessel by piping.

3. The apparatus of claim 1, further comprising a turbine connected to the vessel for generating electricity.

4. The apparatus of claim 1, further comprising a pump fixably connected to a condensation coil.

5. The apparatus of claim 1, further comprising an anchor fixably connected to the bottom of the vessel.

6. The apparatus of claim 1, further comprising an exhaust turbine connected to a pressure valve.

* * * * *